S. HUMMEL.
AUTOMOBILE TIRE.
APPLICATION FILED SEPT. 29, 1916.

1,276,533.

Patented Aug. 20, 1918.

S. Hummel,
Inventor

By Geo. P. Kimmel.
Attorney

UNITED STATES PATENT OFFICE.

SAMUEL HUMMEL, OF FORT YATES, NORTH DAKOTA.

AUTOMOBILE-TIRE.

1,276,533. Specification of Letters Patent. Patented Aug. 20, 1918.

Application filed September 29, 1916. Serial No. 122,863.

*To all whom it may concern:*

Be it known that I, SAMUEL HUMMEL, a citizen of the United States, residing at Fort Yates, in the county of Sioux and State of North Dakota, have invented certain new and useful Improvements in Automobile-Tires, of which the following is a specification.

The present invention relates to vehicle tires and has particular reference to a new and improved inner supporting and shock absorbing structure for association with a tire shoe to obviate the use of the pneumatic tube now employed.

An object of my invention is to provide a novel form of metallic supporting structure for disposition within a tire shoe or casing to absorb shock and to support and strengthen the casing, the same consisting of a coiled metallic strip inherently resilient and having the marginal edges of adjoining convolutions in overlapping relation.

Another object of my invention is to provide a device of the class described which may be cheap to manufacture, quickly installed, is strong and durable and effective in operation.

Other objects and advantages to be derived from the use of my improved tire will appear from the following detailed description and the claim, taken with an inspection of the accompanying drawing, in which:

Figure 1:
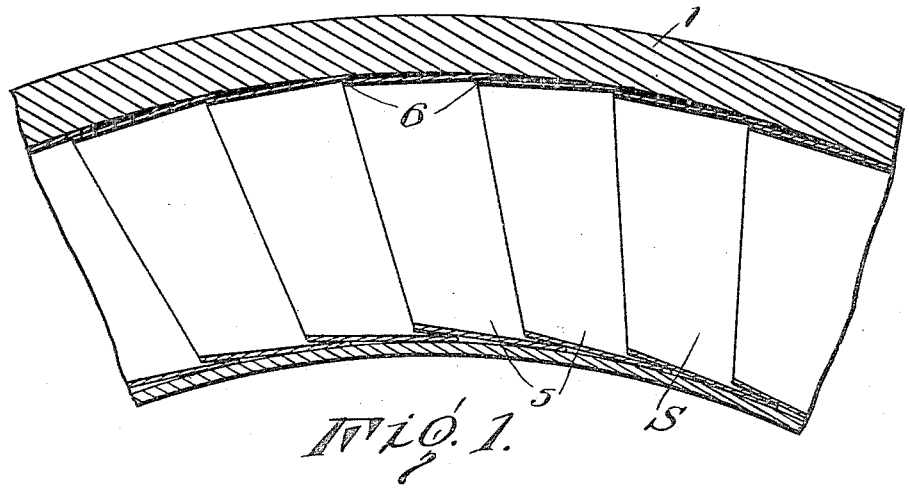
Figure 1 is a fragmental longitudinal sectional view of an automobile tire embodying the improvements of my invention.
Figure 2:
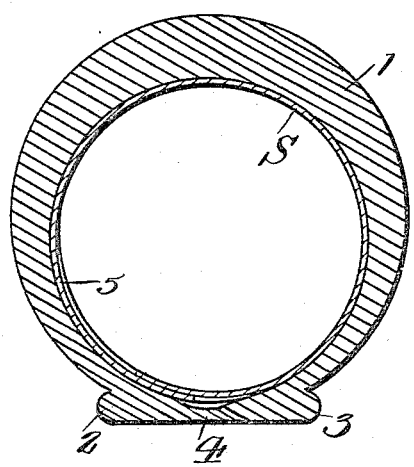
Fig. 2 is a transverse sectional view of the same.

Referring more particularly to the drawing, wherein similar characters of reference designate like and corresponding parts throughout the various views, 1 designates a tire shoe of the usual construction and formed of rubber, or any other suitable material. The shoe 1 is provided with annular ribs 2 and 3 to be engaged by the usual clencher rim. Instead of the shoe being opened as in the standard tire I prefer to vulcanize the same as at 4.

Referring specifically to the supporting and shock absorbing element, the same consists of a flat coil spring designated S in its entirety, the convolutions 5 thereof having their adjoining marginal edges in overlapping relation as at 6 so as to afford a practically continuous tubular yieldable body for disposition within the shoe 1 to support the same and absorb shock imparted thereto.

Figure 3:
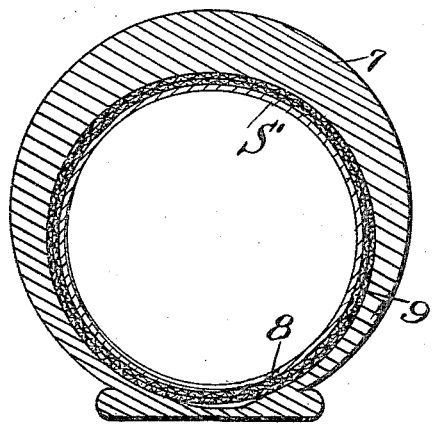
Fig. 3 is a similar view of the modified form of the invention.

Referring to Fig. 3 wherein the modified form of my invention is shown the shoe is designated 7 and is constructed identical with the shoe 1 hereinbefore described. The spring supporting structure is designated S' and is practically identical with that designated S hereinbefore described. However, in this form of my invention I provide a wire cloth jacket 8 and a cotton cloth jacket 9, the former being arranged between the latter and said spring S', both of said jackets 8 and 9 being arranged between the spring and the inner surface of the shoe 7. Of course, I do not limit myself to the exact relative location of the protecting jackets 8 and 9 but the arrangement shown is preferred. This arrangement serves to prevent abrasion of the inner surface of the shoe 7 by the resilient element when the latter is being flexed in use.

In mounting my improved tire on a wheel the annular ribs arranged thereon are gripped by the clencher rim retaining the tire in position. When shocks are imparted to the outer shoe owing to unevenness in a road-way the coil supporting body is caused to flex and is distorted to absorb the shock. It will thus be seen that a simple and effective supporting structure for tires is provided without the use of the unreliable inner tube as now employed in pneumatic tires.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

A tire filler of the class described including, in combination with a tire casing, a resilient stiffening element adapted to be positioned in the tire casing, a wire cloth jacket surrounding said stiffening element, a cotton cloth jacket surrounding said element and the wire cloth jacket and having its outer face adapted to engage the inner face of the tire casing, and the edges of said casing being vulcanized when the filler is positioned therein.

In testimony whereof I affix my signature hereto.

SAMUEL HUMMEL.